(12) United States Patent
Ellison

(10) Patent No.: US 11,828,634 B2
(45) Date of Patent: Nov. 28, 2023

(54) FLUID SENSOR

(71) Applicant: BAE Systems plc, London (GB)

(72) Inventor: William Frank Ellison, Preston (GB)

(73) Assignee: BAE Systems plc, London (GB)

( * ) Notice: Subject to any disclaimer, the term of this patent is extended or adjusted under 35 U.S.C. 154(b) by 18 days.

(21) Appl. No.: 17/610,178

(22) PCT Filed: Jun. 4, 2020

(86) PCT No.: PCT/GB2020/051348
§ 371 (c)(1),
(2) Date: Nov. 10, 2021

(87) PCT Pub. No.: WO2020/245587
PCT Pub. Date: Dec. 10, 2020

(65) Prior Publication Data
US 2022/0221317 A1   Jul. 14, 2022

(30) Foreign Application Priority Data
Jun. 5, 2019 (EP) ..................................... 19275073
Jun. 5, 2019 (GB) ..................................... 1907983

(51) Int. Cl.
*G01F 1/40* (2006.01)
*G01P 5/14* (2006.01)

(52) U.S. Cl.
CPC . *G01F 1/40* (2013.01); *G01P 5/14* (2013.01)

(58) Field of Classification Search
CPC .............................. G01P 5/14; G01F 1/34–40
See application file for complete search history.

(56) References Cited

U.S. PATENT DOCUMENTS

| 6,308,581 | B1* | 10/2001 | Deeds ....................... G01P 5/14 |
| | | | 73/182 |
| 6,508,136 | B1* | 1/2003 | Deeds ...................... G01F 1/372 |
| | | | 73/861.52 |
| 9,714,100 | B2* | 7/2017 | D'Arbonneau ........... G01P 5/14 |
| 9,772,346 | B2* | 9/2017 | Ellison .................. B64D 43/02 |
| 10,302,472 | B1* | 5/2019 | Holmes ..................... G01F 1/37 |
| 11,035,704 | B2* | 6/2021 | Kane .......................... G01F 1/34 |
| 2016/0334253 | A1* | 11/2016 | Querry ...................... G01P 5/14 |

FOREIGN PATENT DOCUMENTS

| GB | 2491167 A | 11/2012 |
| WO | 2015059085 A1 | 4/2015 |

OTHER PUBLICATIONS

Extended European Search Report for European Appl. No. 19275073.5 dated Dec. 6, 2019, 8 Pages.
GB Search Report for GB1907983.9 dated Nov. 19, 2019, 3 Pages.
International Search Report & Written Opinion for PCT/GB2020/051348 dated Sep. 4, 2020, 5 Pages.

* cited by examiner

*Primary Examiner* — Justin N Olamit
(74) *Attorney, Agent, or Firm* — Maine Cernota & Curran

(57) ABSTRACT

There is disclosed a fluid sensor for measuring the pressure of a fluid, the fluid sensor comprising: a surface; a recess formed at the surface, the recess being configured to affect the pressure of the fluid flowing at the recess, at least one ambient sensor port for measuring ambient fluid pressure at the surface, and at least one recess sensor port for measuring the fluid pressure at the recess.

17 Claims, 6 Drawing Sheets

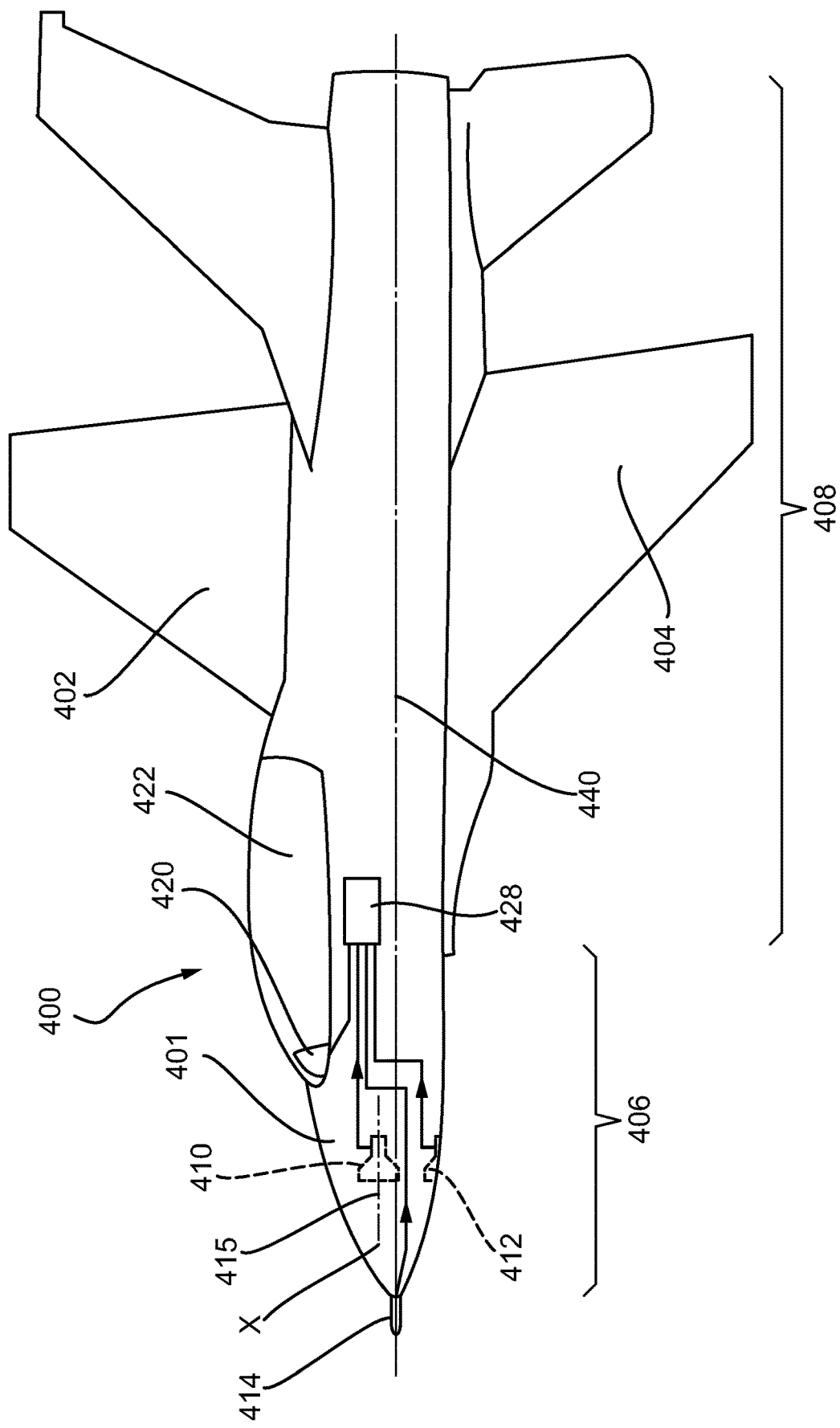

FLUID SENSOR

RELATED APPLICATIONS

This application is a national phase application filed under 35 USC § 371 of PCT Application No. PCT/GB2020/051348 with an International filing date of Jun. 4, 2020, which claims priority of GB Patent Application 1907983.9 filed Jun. 5, 2019 and EP Patent Application 19275073.5 filed Jun. 5, 2019. Each of these applications is herein incorporated by reference in its entirety for all purposes.

FIELD OF THE INVENTION

The present invention relates to a fluid sensor and a method of sensing fluid flow.

BACKGROUND OF THE INVENTION

It is known from the applicant's earlier application WO 2015/059085 to provide a fluid flow sensor comprising a blister, projecting from a surface into local fluid flow, and which is provided with fluid pressure ports adjacent to the blister. The blister modifies local fluid dynamics, and characteristics of the fluid flow can be determined from the fluid pressure data obtained at the pressure ports.

SUMMARY OF THE INVENTION

According to a first aspect of the invention, there is provided a fluid sensor for measuring the pressure of a fluid, the fluid sensor comprising: a surface; a recess formed at the surface, the recess being configured to affect the pressure of the fluid flowing at the recess, at least one ambient sensor port for measuring ambient fluid pressure at the surface, at least one recess sensor port for measuring the fluid pressure at the recess.

As such the provision of a fluid data sensor having a projecting component can be avoided. Avoiding the provision of such a projecting component can tend to reduce the chance of damage to the sensor e.g. during maintenance. The drag that the sensor generates can also tend to be reduced.

The fluid sensor may comprise a first recess sensor and a second recess sensor.

Providing two recess sensors can provide some redundancy, for example if one recess sensor malfunctions. Further, the provision of two sensors can, if both are working, provide for greater resolution of information and/or smoothing of information (e.g. by averaging of measurements).

The recess may define a longitudinal axis, the longitudinal axis thereby defining a first side of the recess and a second side of the recess, and wherein the first recess sensor is located on the first side of the axis and the second recess sensor is located on the second side of the axis.

The first and second recess sensors may be offset laterally from the longitudinal axis by the same amount.

The recess may have a wider aspect at a first end and taper to a narrower aspect at a second end.

Such a provision can tend to encourage high pressure areas within the recess which can be used to generate a stronger signal (e.g. a better signal to noise ratio) from which to infer characteristics about fluid velocity. The tapering may in particular be along the principal direction of expected flow.

The wider aspect and the narrower aspect may be connected by a first side wall, a floor, and a second side wall.

At least one further recess sensor port may be provided in the first or second side wall.

The recess may taper gradually between the wider and narrower aspect.

The recess may have a maximum depth between the wider and narrower aspect.

The recess depth may develop gradually between the wider and narrower aspect.

As such the recess can tend to deter flow separation and so provide readily interpreted data. If the recess were within a turbulent flow region, data may be less readily interpreted.

The fluid sensor according may further comprise: a transducer at each of the respective sensor ports for converting the detected fluid pressure into a fluid pressure signal; a processor operably connected to each of the transducers and configured to receive the fluid pressure signal from each transducer, generate from the fluid pressure signals a fluid pressure profile, determine, using the fluid pressure profile, at least one characteristic of the fluid.

According to a second aspect of the invention there is provided a method of sensing fluid flow comprising: providing a fluid sensor, the fluid sensor comprising: a surface; a recess formed at the surface, the recess being configured to affect the pressure of the fluid flowing at the recess; at least one ambient sensor port for measuring ambient fluid pressure at the surface; at least one recess sensor port for measuring the fluid pressure at the recess, exposing the fluid sensor to fluid flow, detecting the fluid pressure at each of the ambient sensor port and the recess sensor port to determine a fluid pressure profile, acquiring a relationship between fluid pressure profiles and a predetermined fluid characteristic, applying the relationship to the fluid pressure profile to determine the predetermined fluid characteristic.

BRIEF DESCRIPTION OF THE DRAWINGS

Acquiring a relationship between the fluid pressure profiles and the predetermined fluid characteristic may comprise acquiring a look up table mapping fluid pressure profiles to predetermined fluid characteristics.

Acquiring a relationship between the fluid pressure profiles and the predetermined fluid characteristic may comprise establishing a predictive algorithm.

The predetermined fluid characteristic may be the fluid velocity at the surface of the sensor.

Figure 1:
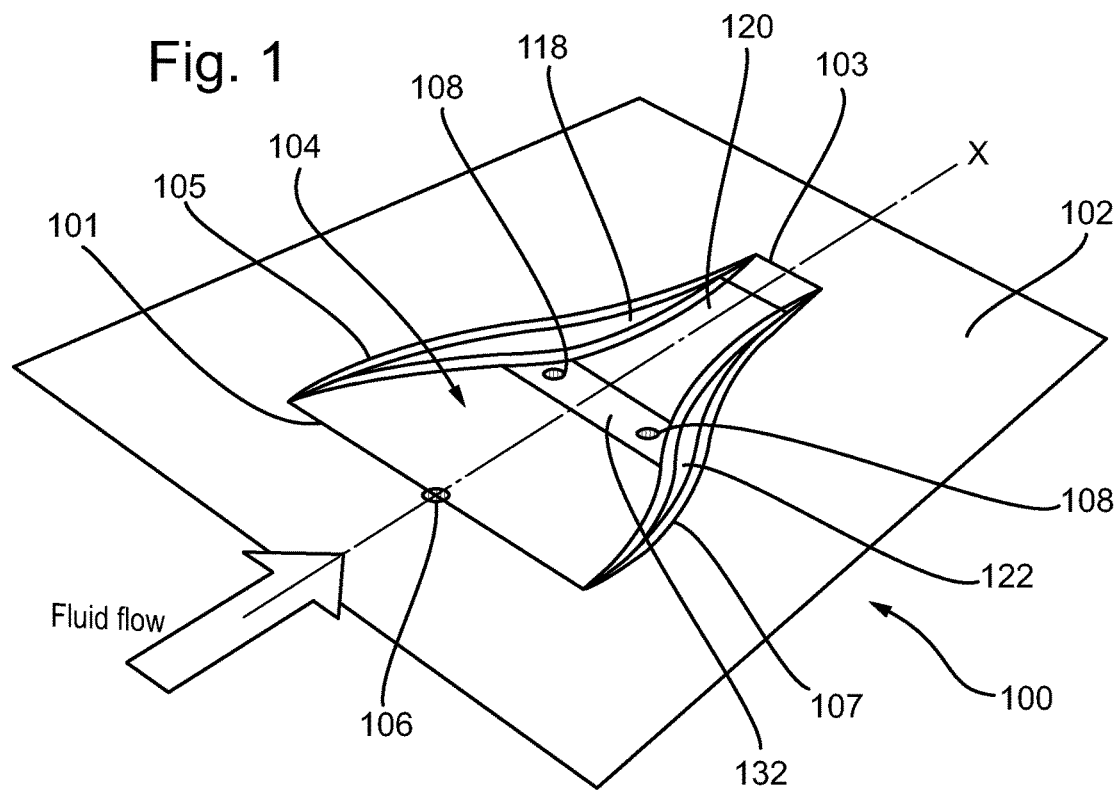
Figure 2:
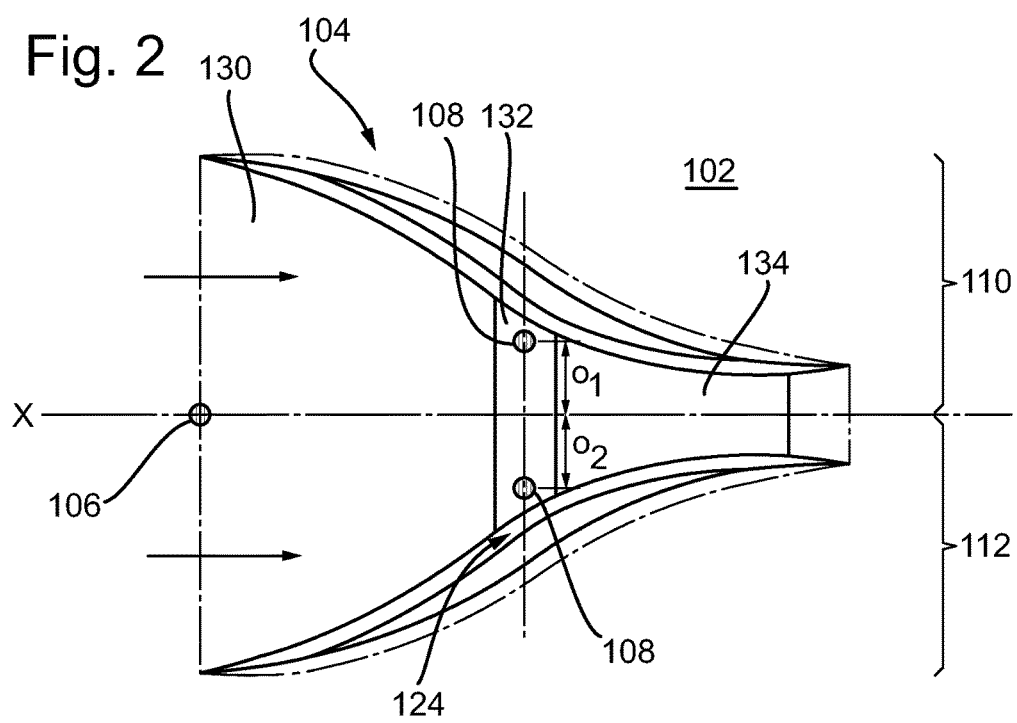
Figure 3A:
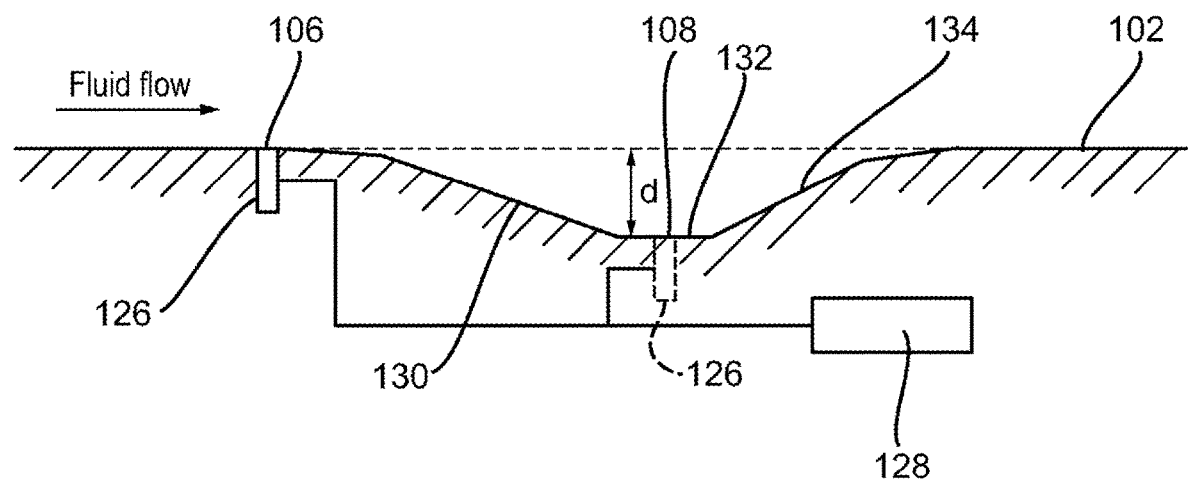
Figure 3B:
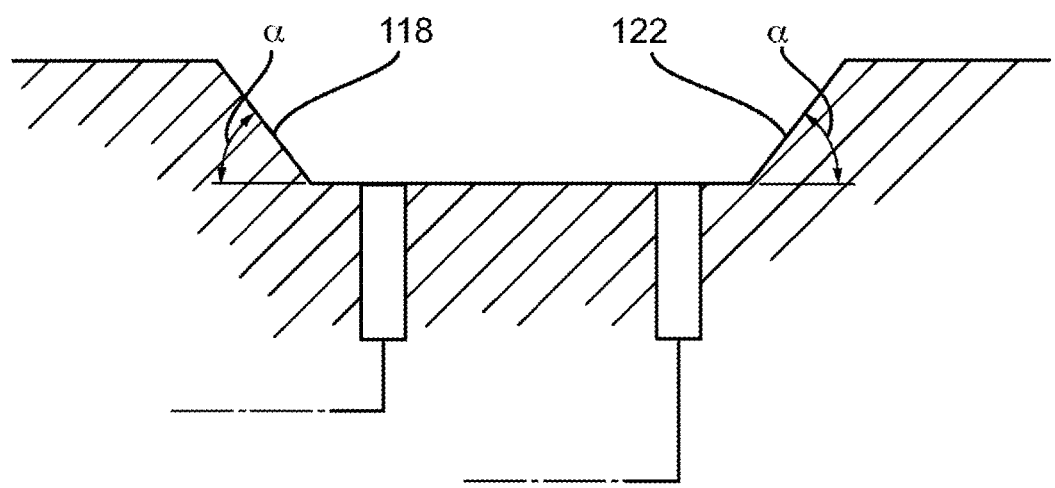
Figure 4:
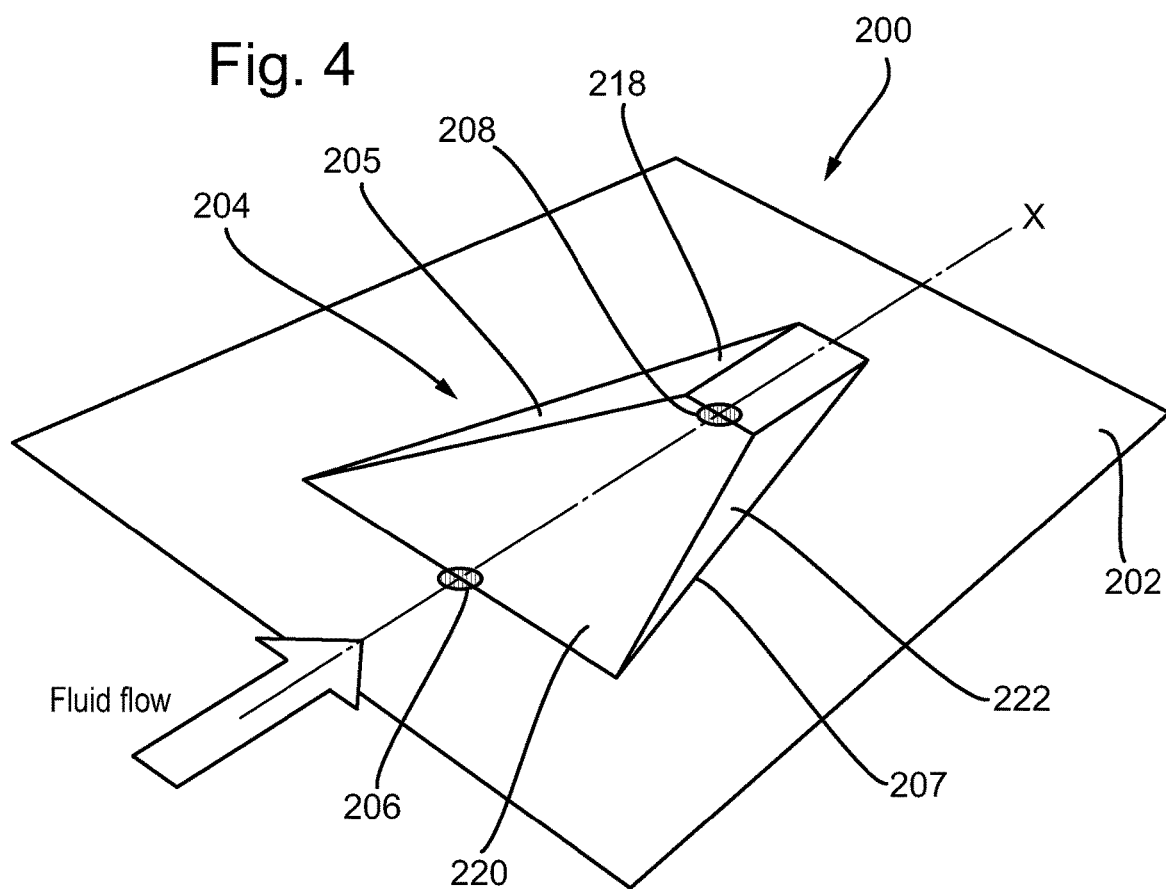
Figure 5:
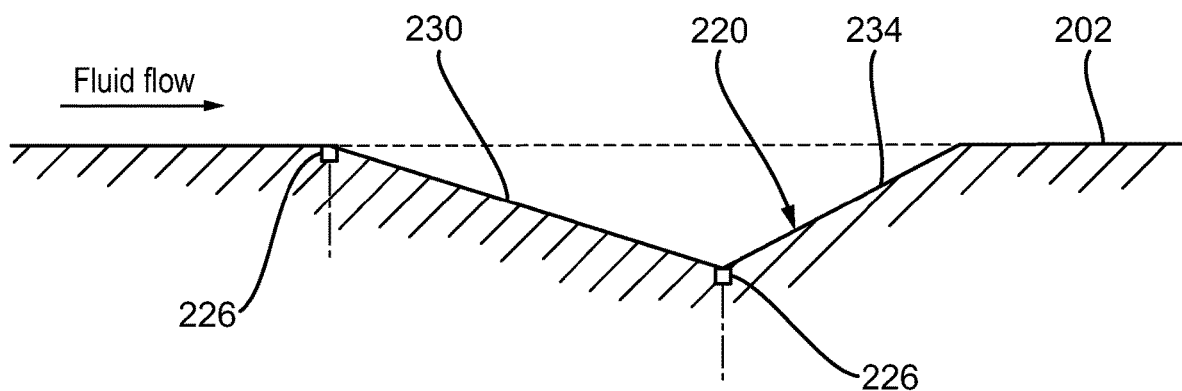
Figure 6:
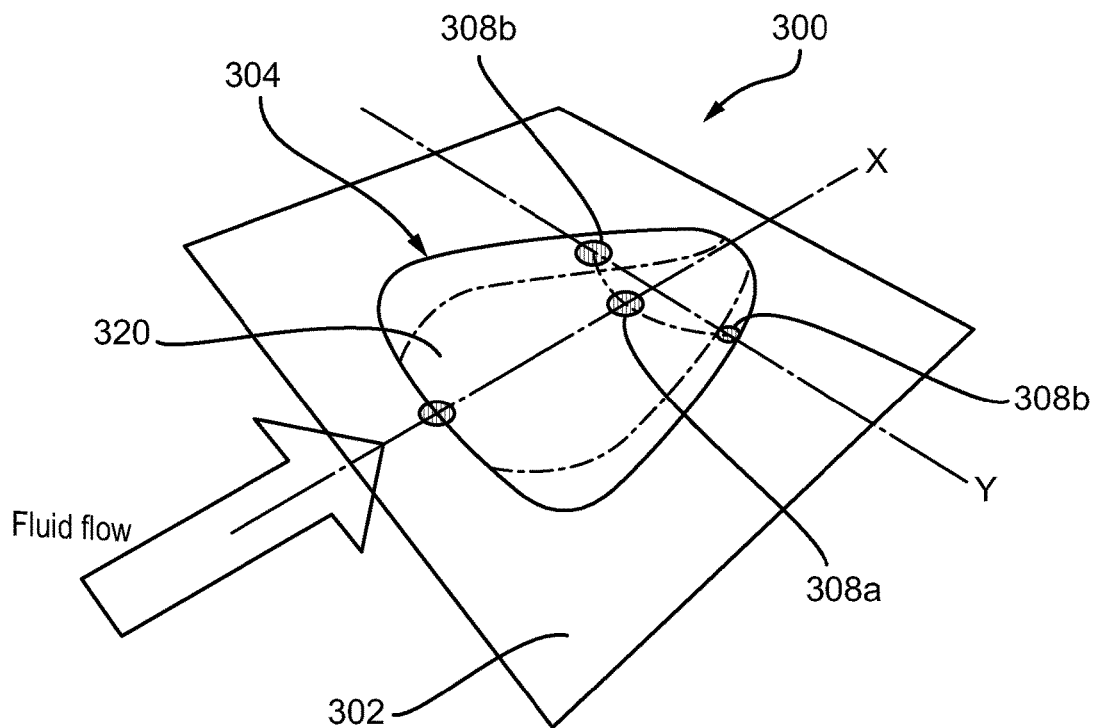
Figure 7:
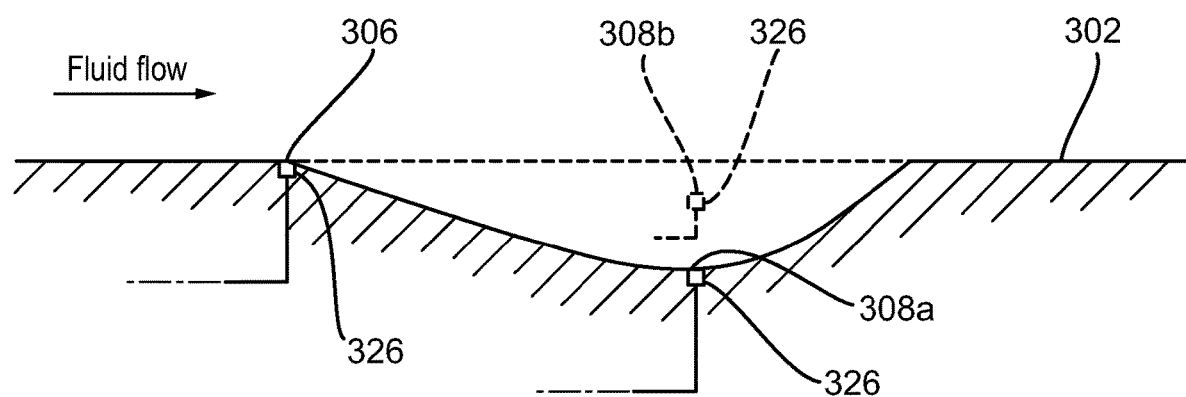
Figure 8:
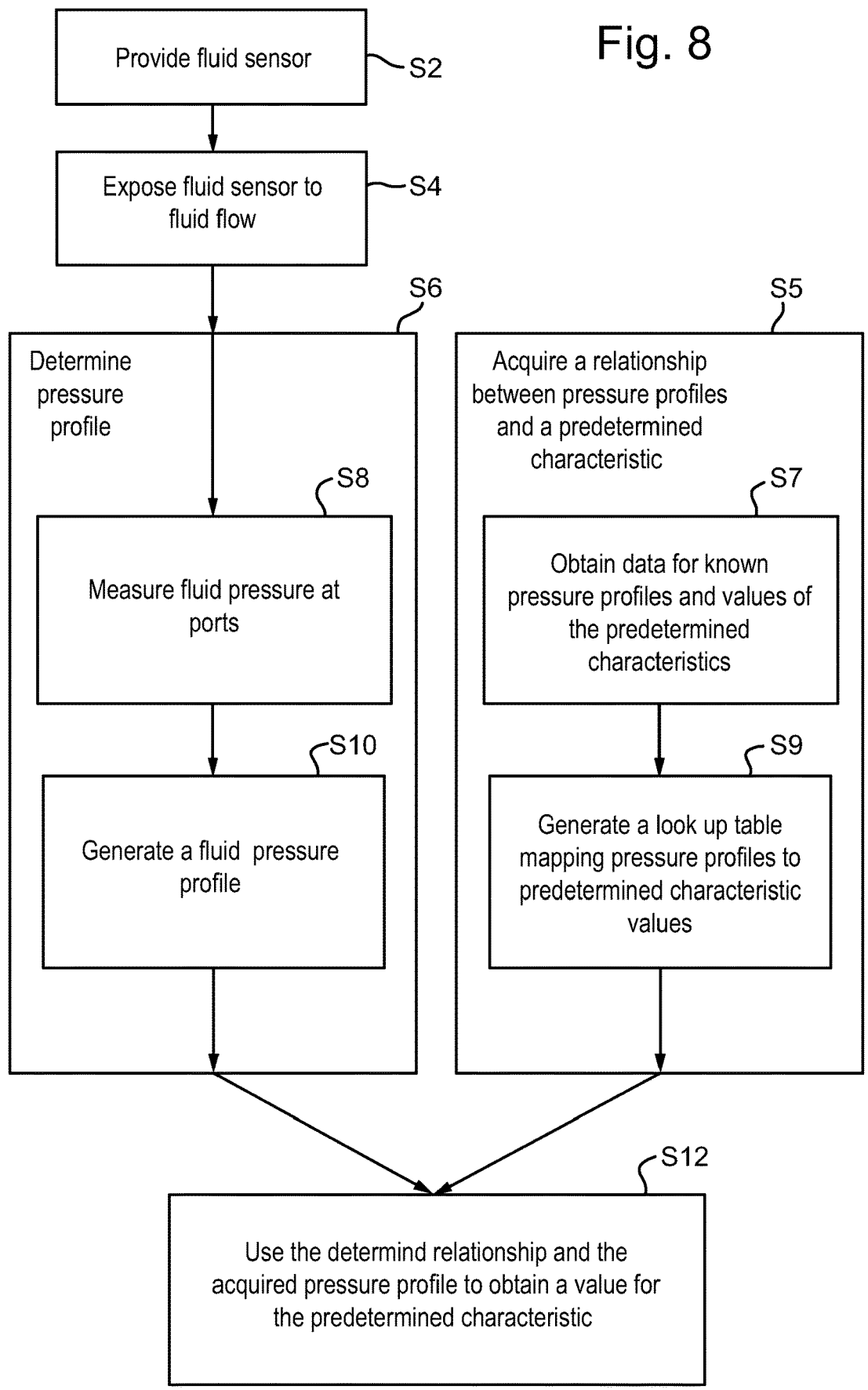

So that the invention may be well understood at least one embodiment thereof will be described below, with reference to the following figures of which:

FIG. 1 shows a three-dimensional representation of a fluid sensor;

FIG. 2 shows an elevation representation of the fluid sensor of FIG. 1;

FIG. 3*a* shows a cross sectional view of the fluid sensor of FIG. 1, along a longitudinal axis;

FIG. 3*b* shows a cross sectional view of the fluid sensor of FIG. 1, along a lateral axis;

FIG. 4 shows a three-dimensional representation of a further fluid sensor;

FIG. 5 shows a cross sectional view of the fluid sensor of FIG. 4 along a longitudinal axis;

FIG. 6 shows three-dimensional representation of a still further fluid sensor;

FIG. 7 shows a cross sectional view of the fluid sensor of FIG. 6 along a longitudinal axis;

FIG. 8 shows a flow diagram setting out a method of sensing a fluid; and

FIG. 9 shows diagrammatically an aircraft comprising air sensors.

DETAILED DESCRIPTION

Referring to FIGS. 1, 2, 3a and 3b there is shown a first fluid sensor 100 comprising a surface 102, a recess 104, an ambient sensor port 106 and recess sensor ports 108.

The surface 102 may be part of the outer skin of a body, vehicle or platform. The surface 102 is a planar surface; however variant surfaces are contemplated that need not be planar.

The fluid sensor 100 is substantially symmetrical, having a similar first 110 and second 112 side, and thereby defines a longitudinal axis X about which it is symmetrical. (Alternative embodiments are envisaged which would not need to be symmetrical).

The rim of the recess 104 comprises a leading edge 101, a trailing edge 103 and two side edges 105, 107. These edges together generally define a funnel shape.

The recess 104 is defined by a first side wall 118, a floor 120 and a second side wall 122.

The floor 120 extends from both the leading edge 101 and the trailing edge 103 to a maximum depth section 132. Further, the floor 120 extends to the base of each of the first and second side walls 118, 122.

The floor comprises a down-ramp section 130 interconnecting the leading edge 101 with the maximum depth section 132. The floor 120 comprises an up-ramp section 134 interconnecting the maximum depth section 132 with the trailing edge 103. The longitudinal aspect of the down-ramp section 130 is approximately equal to the longitudinal aspect of the up-ramp section 134, thereby locating the maximum depth section 132 at the longitudinal centre of the sensor. (As shown, the maximum depth section 132 is approximately a quarter the length of the down-ramp or up-ramp section, longitudinally. Thus it occupies a central 'ninth' (approximately 10%) of the longitudinal aspect of the sensor. However, in other embodiments the maximum depth section may be wider, occupying a central 10-30%).

The leading edge 101 is wider than the trailing edge 103. In the present sensor, the leading edge 101 is approximately four times wider than the trailing edge 103.

The side walls 118 and 122 extend from the surface 102 at the side edges 105 and 107 respectively at an angle α configured to balance sensing performance (in particular to maximise the pressure effect) and minimisation of flow separation (in particular the avoidance of flow separation altogether). Accordingly the angle may be approximately 45 degrees. (In variants on this embodiment, the angle α may be any angle between 30 and 60 degrees). Each of the side walls 118 and 122 abut the floor 120 at their respective bases.

Each side edge 105, 107 is curved with a single point of inflection 124 approximately at its midpoint. Accordingly each side edge defines an S-curve. The curvature is such that the offset between the wall and the axis reduces increasingly going from the leading edge 101 to the point of inflection 124 but reduces decreasingly going from the point of inflection 124 to the trailing edge 103.

Thus the recess provides a smoothly tapered channel through which fluid can flow with reduced chance of boundary layer separation occurring, whilst tending to provide certain areas within the recess where fluid pressure will be higher compared to the surface.

To measure the ambient pressure, the ambient sensor port 106 is positioned at the leading edge 101 and on the longitudinal axis.

To measure the higher pressure in the recess 104, the recess sensor ports 108 are provided at the maximum depth section 132 of the floor 120. In the present sensor, two recess ports are provided and these are offset laterally in opposite directions from the longitudinal axis by a distance $o_1$ and $o_2$. Here $o_1$ and $o_2$ are substantially equal.

Referring particularly to FIG. 3a, for each sensor port 106, 108 there is further provided a transducer 126. The transducers 126 are operably connected to a processor 128.

Each transducer 126 is arranged at its respective sensor port such that it may detect the fluid pressure at the port and convert that into a fluid pressure signal for passing to the processor 128.

As shown in FIG. 3a, the transducers 126 are located at the mouth of the ports 108; however, in alternative embodiments, the transducers 126 may be remote from the mouth of the ports 108 and in communication therewith by way of an interconnecting channel.

Referring to FIGS. 4 and 5, a second fluid sensor 200 is shown. This fluid sensor is broadly similar to the first fluid sensor 100 and so for clarity not all components are discussed or provided with a reference numeral. Where reference numerals are provided in respect of a component which is comparable to one in the first fluid sensor 100, the reference numeral may be incremented by 100.

The second fluid sensor 200 comprises a recess 204 which is defined by a floor 220 and a pair of side walls 218 and 222.

The floor comprises a down-ramp 230 and an up-ramp 234 section where the down-ramp 230 has a greater longitudinal aspect than the up-ramp 234 section.

Each side wall extends from a respective side edge 205 or 207. The side edges are substantially straight lines and as such, the side walls taper gradually but are not curved.

As such the rim of the recess 204 generally defines a trapezoidal shape.

A single ambient port 206 is provided at the leading edge and on the longitudinal axis X.

A single recess port 208 is provided at the maximum depth section of recess 204 and the longitudinal axis X.

Referring to FIGS. 6 and 7, a third fluid sensor 300 is shown. This fluid sensor is broadly similar to the first and second fluid sensors 100, 200 and so for clarity not all components are discussed or provided with a reference numeral. Where reference numerals are provided in respect of a component which is comparable to one in the first fluid sensor 100, the reference numeral may be incremented by 200.

The third fluid sensor 300 defines a recess 304 which has a rim in the general shape of a filleted equilateral triangle.

The recess 304 is defined by a single curved floor surface 320 which extends down from the rim at surface 302 to a maximum depth. To aid with understanding of this surface, dashed lines are provided in FIG. 6.

The fluid sensor 300 comprises an ambient port 306 (at a leading edge of the rim) and three recess ports 308a, 308b. The central sensor port 308a is positioned at a region of maximum depth and on the longitudinal axis X. The lateral sensor ports 308b are positioned at an intermediate depth and are offset from the longitudinal axis X by an equal and opposite amount along the lateral axis Y passing through the sensor port 308a.

In operation, and referring to FIG. 8, a fluid sensor (for example 100, 200 or 300) is provided at step S2 and exposed to a fluid flow at step S4.

Then at generalised step S6, the fluid pressure profile can be determined. More particularly, the fluid pressure at the ports can at step S8 be measured (using for example the transducers 126 and the processor 128) and consolidated at step S10 to provide an overall fluid pressure profile for the fluid sensor. The fluid pressure profile is a time-variant signal.

Once obtained, the fluid pressure profile can be used at step S12 to infer certain characteristics of the fluid flow by reference to a previously-acquired relationship between the fluid pressure profile (for the particular fluid sensor) and a predetermined characteristic (generalised step S5).

More particularly, the relationship is acquired by at step S7 previously having obtained data for known pressure profile and known values of the certain fluid characteristics, and then at step S9 having used that data has to populate a look up table.

However, in alternative embodiments, instead of using a look up table to determine the relationship between pressure profiles and values of the fluid characteristics, a predictive algorithm may be used. Such a predictive algorithm can be a neural network which has been trained, using the known data, to map pressure profiles onto fluid characteristics.

It is contemplated that various predetermined characteristics of the fluid flow may be inferred using this approach. In particular, the fluid velocity and the fluid direction at the surface may be the predetermined characteristic determined in this way.

Referring to FIG. 9 there is shown an aircraft 400.

The aircraft 400 is in the general form of a jet aircraft and defines an aircraft longitudinal axis 440.

The aircraft 400 comprises a wing structure made up of a starboard wing 402 and port wing 404. The portion of the aircraft 400 forwards of the wing structure is referred to as the forebody 406. The portion of the aircraft backwards of the forebody is referred to as the afterbody 408. The aircraft 400 is clad at its outer surfaces in a skin 401.

The aircraft 400 further comprises a first recessed fluid sensor 410 and a second recessed fluid sensor 412. Each of the sensors 410, 412 is formed by a recess in the skin 401 of the aircraft 400. Each recess is distinct from the overall topography of the skin, which may be planar in proximity to the recess or may be arcuate or otherwise contoured in proximity to the recess.

The fluid sensors 410, 412 are substantially similar to the fluid sensor 100, and are configured for sensing air (fluid sensors substantially similar to for example sensor 200 or 300 may be used in alternative embodiments). As such each of air sensors 410 and 412 comprise a port at the main skin topography (e.g. at the leading rim edge of the recess) and two ports within the respective recess. Associated with each of these ports is a respective transducer for generating an electrical signal representative of air pressure.

The first air sensor 410 is located on the port-side of the forebody 406, the second air sensor 412 is located on the underside of the forebody 406. A further air sensor (not shown) may be provided on the starboard-side of the forebody 406. The first air sensor 410 and second air sensor 412 comprise recesses having substantially the same form as fluid sensor 100.

The air sensors are located on the forebody such that the flow axis 415 they define (for example the flow axis 415 defined by the first air sensor 410, which is substantially equivalent to the longitudinal axis X of the fluid sensor 100) is generally aligned with the longitudinal axis 440 of the aircraft 400. This alignment may for example arise from the flow axis 415 being parallel with the longitudinal axis 440.

Still further, the aircraft 400 comprises a central processor 428 which receives as input from each of the air sensors 410 and 412 the electrical signals representative of pressure at their respective ports.

The processor 428 is configured to determine from these inputs certain characteristics of the air flow at the aircraft.

For example, the processor 428 is able to determine the local airspeed and the local direction of air flow for each sensor. This determination may be made by reference to an established data set (for example provided in the form of a look up table correlating pressure profiles with fluid characteristics).

With air pressure, airspeed and air direction determined for each sensor, the processor 428 may be further configured to determine aircraft characteristics such as pressure altitude, angle of attack and sideslip.

The aircraft 400 further comprises a pitot tube 414 at the foremost point which may also feed a signal representative of pressure into the central processor 428 for use in further corroborating results. The provision of a pitot tube enables further pressure data to be collected; however alternative embodiments do not comprise a pitot tube, and sufficient air pressure data can be collected from only the air sensors 410, 412.

The processor 428 is further connected to a display 420 in the cockpit 422 so that the determinations of the processor 428 can be displayed to a pilot in a human-readable format.

In operation, with the aircraft in flight (for example any of the phases of flight including take off, climb, cruise, descent and landing), air will flow over the forebody and through the channels defined by the recessed air sensors 410 and 412.

Whilst flowing through the air sensors 410, 412, the air will impinge on the pressure sensor ports and give rise to the generation of air pressure data at the respective transducers.

The air pressure data from each of the transducers is relayed to the central computer 428 where it can be processed to determine an air pressure profile for each of the air sensors 410, 412.

From the sensor-specific air pressure profile, values of certain flow characteristic can be determined. For example the air velocity at each air sensor 410, 412 may be determined.

Alternatively or additionally, if two or more recess ports are provided at each air sensor, then air flow direction for such an air sensor can be determined.

Moreover, with air pressure profiles provided for two or more separate air sensors 410, 412, information about flight characteristics (e.g. angle of attack, sideslip) can be determined at the central processor.

Further, with two or more pressure profiles obtained from separate sensors 410, 412, an average of the values could be taken. The average may be the mean, mode or median.

Still further, if three recessed air sensors or more are provided, then any outlying data can be identified and ignored, for example by majority voting. Thus an aircraft 400 provided with not only air sensor 410, 412 but also a further air sensor on the starboard-side (not shown), can compare air pressure profiles so that any outliers in the readings will become apparent.

Thus, where two or more air sensors are provided then not only does that lead to a higher resolution understanding of air flow at the forebody, but also steps can be taken to smooth out the results from any error-prone or malfunctioning air sensor.

In addition to the embodiments explicitly discussed above, the skilled person would be able to readily understand further inventions within the scope of the present disclosure. Such inventions could combine features from the above embodiments.

Other variants would also be within the scope of the invention such as: the provision of a surface which is not necessarily planar, but could be curved or faceted; the provision of a non-symmetrical recess; a greater number of ports could be provided as an array for more resolution in determining the pressure profile; and the topography of the recess need not be configured for fluid flow from a particular direction, and instead could be configured to determine fluid flow from any direction, in such variants, the recess may have a rotational symmetry and be absent a taper.

The surface and the recess may be fabricated from a smooth skin material that is substantially non-porous and suitable for forming into the relevant three dimensional shaped. For example the surface and the recess may be formed from a metal, optionally coated with a paint.

The invention claimed is:

1. A fluid sensor for measuring the pressure of a fluid, the fluid sensor comprising:
    a surface;
    a recess formed at the surface, the recess being configured to affect a pressure of the fluid flowing at the recess, wherein a rim of the recess comprises a leading edge, a trailing edge, and two side edges;
    at least one ambient sensor port for measuring ambient fluid pressure at the surface;
    a first recess sensor port and a second recess sensor port for measuring the fluid pressure at the recess;
    a transducer at each of the respective sensor ports for converting the measured fluid pressure into a fluid pressure signal;
    a processor operably connected to each of the transducers, the processor being configured to:
    receive the fluid pressure signal from each transducer;
    generate from the fluid pressure signals a fluid pressure profile; and
    determine, using the fluid pressure profile, a fluid velocity and a fluid direction at the surface,
    wherein the recess defines a funnel shape wherein the leading edge is wider than the trailing edge and wherein the fluid sensor defines a longitudinal axis,
    wherein the leading edge is upstream the trailing edge in the fluid direction at the surface,
    wherein the at least one ambient sensor port is positioned at the leading edge and on the longitudinal axis,
    wherein the recess has a maximum depth, and
    wherein the first recess sensor port and the second recess sensor port are disposed at the maximum depth.

2. The fluid sensor according to claim 1 wherein the longitudinal axis defines a first side of the recess and a second side of the recess, and wherein the first recess sensor is located on the first side of the axis and the second recess sensor is located on the second side of the axis.

3. The fluid sensor according to claim 2, wherein the first and second recess sensors are offset laterally from the longitudinal axis by the same amount.

4. The fluid sensor according to claim 1 wherein the recess has a wider aspect at a first end and tapers to a narrower aspect at a second end and wherein the wider aspect and the narrower aspect are connected by a first side wall, a floor, and a second side wall.

5. The fluid sensor according to claim 4 wherein at least one further recess sensor port is provided in the first or second side wall.

6. The fluid sensor according to claim 4 wherein the recess tapers gradually between the wider and narrower aspect.

7. The fluid sensor according to claim 4 wherein the recess has a maximum depth between the wider and narrower aspect.

8. The fluid sensor according to claim 7 wherein the recess depth develops gradually between the wider and narrower aspect.

9. The fluid sensor according to claim 1 wherein the recess has a maximum depth and wherein the first recess sensor port and the second recess sensor port are disposed at the maximum depth.

10. A method of sensing fluid flow comprising:
    providing a fluid sensor, the fluid sensor comprising:
    a surface;
    a recess formed at the surface, the recess being configured to affect a pressure of a fluid flowing at the recess, wherein a rim of the recess comprises a leading edge, a trailing edge, and two side edges;
    at least one ambient sensor port for measuring ambient fluid pressure at the surface;
    a first recess sensor port and a second recess sensor port for measuring the pressure of fluid flowing at the recess; and
    a transducer at each of the respective sensor ports for converting the measured fluid pressure into a fluid pressure signal,
    wherein the recess defines a funnel shape wherein the leading edge is wider than the trailing edge and wherein the fluid sensor defines a longitudinal axis,
    wherein the leading edge is upstream the trailing edge in a fluid direction at the surface,
    wherein the at least one ambient sensor port is positioned at the leading edge and on the longitudinal axis,
    exposing the fluid sensor to fluid flow;
    detecting a fluid pressure at each of the ambient sensor port and the recess sensor ports to determine a fluid pressure profile;
    acquiring a relationship between fluid pressure profiles and predetermined fluid characteristics; and
    applying the relationship to the fluid pressure profile to determine the predetermined fluid characteristics,
    wherein the predetermined fluid characteristics comprise fluid velocity and the fluid direction at the surface,
    wherein the recess has a maximum depth, and
    wherein the first recess sensor port and the second recess sensor port are disposed at the maximum depth.

11. The method according to claim 10 wherein acquiring a relationship between the fluid pressure profiles and the predetermined fluid characteristic comprises acquiring a look up table mapping fluid pressure profiles to predetermined fluid characteristics.

12. The method according to claim 10 wherein acquiring a relationship between the fluid pressure profiles and the predetermined fluid characteristic comprises establishing a predictive algorithm.

13. The method according to claim 10 wherein the predetermined fluid characteristic is the fluid velocity at the surface of the sensor.

14. The method according to claim 10 wherein the recess has a maximum depth and wherein the first recess sensor port and the second recess sensor port are disposed at the maximum depth.

15. A fluid sensor for measuring the pressure of a fluid, the fluid sensor comprising:
    a surface;

a recess formed at the surface, the recess being configured to affect a pressure of the fluid flowing at the recess, wherein a rim of the recess comprises a leading edge, a trailing edge, and two side edges;

at least one ambient sensor port for measuring ambient fluid pressure at the surface;

at least three recess sensor ports for measuring the fluid pressure at the recess;

wherein the recess defines a funnel shape wherein the leading edge is wider than the trailing edge and wherein the fluid sensor defines a longitudinal axis, wherein the leading edge is upstream the trailing edge in a fluid direction at the surface, wherein the recess has a maximum depth, wherein at least one of the at least three recess sensor ports are disposed at the maximum depth, and wherein the at least one ambient sensor port is positioned at the leading edge and on the longitudinal axis.

16. The fluid sensor of claim 15, further comprising:

a transducer at each of the respective sensor ports for converting the measured fluid pressure into a fluid pressure signal;

a processor operably connected to each of the transducers, the processor being configured to:

receive the fluid pressure signal from each transducer;

generate from the fluid pressure signals a fluid pressure profile; and determine, using the fluid pressure profile, fluid velocity and fluid direction at the surface.

17. The fluid sensor of claim 16, wherein processor is further configured to compare the fluid pressure signals generated by the transducers disposed in the at least three recess sensor ports to one another and to identify and ignore any data by majority voting.

* * * * *